March 7, 1933. F. G. SLAGEL 1,900,741

ICE PAN

Filed July 29, 1929

Inventor
Franklin G. Slagel
By Wayne M. Hart
Attorney

Patented Mar. 7, 1933

1,900,741

UNITED STATES PATENT OFFICE

FRANKLIN G. SLAGEL, OF BUFFALO, NEW YORK, ASSIGNOR TO FEDDERS MANUFACTURING COMPANY, INC., OF BUFFALO, NEW YORK, A CORPORATION OF NEW YORK

ICE PAN

Application filed July 29, 1929. Serial No. 381,976.

This invention relates to mechanical refrigeration and more particularly to trays for containing liquids to be frozen.

The evaporators of domestic mechanical refrigerating systems are formed to provide a chamber into which a pan containing a liquid to be frozen is inserted. Condensation freezes between the pan and the evaporator, and in order to readily remove the pan it is the usual practice to solder or secure extensions to the side walls of the pan and to attach a plate and a handle to the extensions, the plate serving the function of covering the open end of the freezing chamber and limiting the insertion of the pan in the chamber. Because of the frost forming between the pan and the chamber wall, considerable force must be applied to the handle in loosening the pan and this force is imposed on the joint between the extensions and the pan, such force frequently loosening the joints. Further with applied extensions, it is difficult to locate the registering apertures in the plate and the extensions because unless extreme manufacturing accuracy is maintained in securing the extensions the apertures will not register and securing bolts can not be applied.

It is an object of this invention to overcome the above disadvantages and to simplify construction by forming the tray extension as a part of the tray.

Another object of the invention is to provide a sheet metal pan of the character set forth with an extension which forms a rugged connection between the tray and the handle.

A further object of the invention is to provide a pan for mechanical refrigerating apparatus which consists of two pieces of metal which can be cheaply manufactured and assembled without sacrificing ruggedness.

Other objects and advantages of the invention will become apparent as the description progresses.

Figure 1:
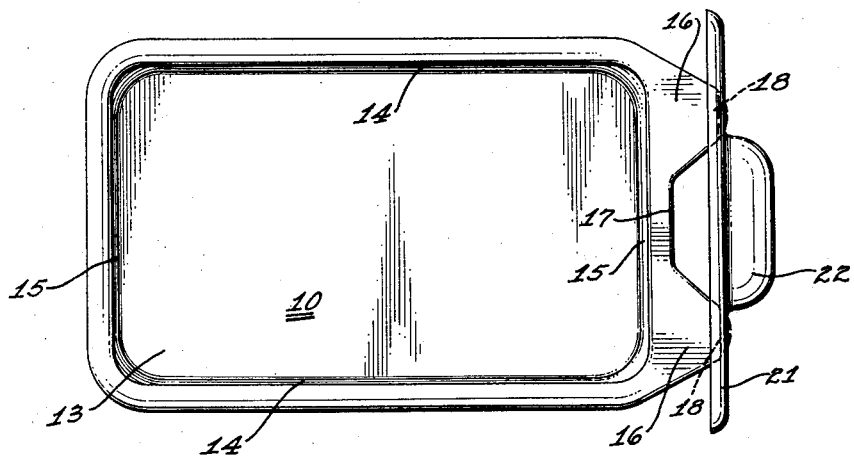
Figure 2:
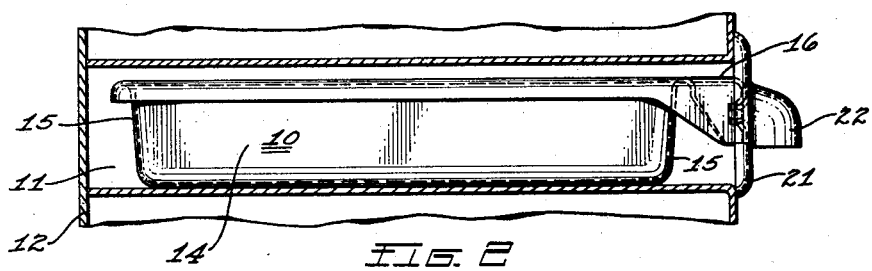
Figure 3:
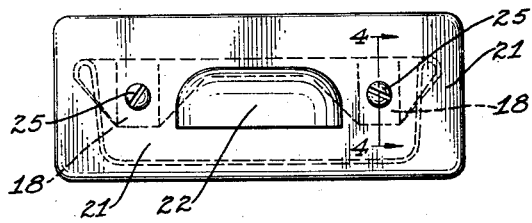
Figure 4:
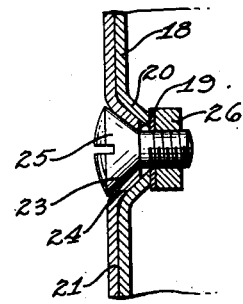

In the accompanying drawing which forms a part of this application, Fig. 1 is a top plan view of a pan assembly incorporating my invention; Fig. 2 is a fragmentary sectional view of an evaporator with the pan assembly in the freezing chamber; Fig. 3 is a front elevation of the pan assembly; and Fig. 4 is a sectional view taken on line 4—4 of Fig. 3.

Referring to the drawing by characters of reference, 10 is the tray portion of the pan for containing liquid to be frozen or stored after freezing in a chamber 11 of the evaporator 12 of a mechanical refrigerating system. The freezing chamber is open at the front wall of the evaporator, while refrigerant for absorbing heat from the contents of the pan is carried in the portion of the evaporator surrounding the freezing chamber.

The pan is formed, preferably, from a single piece of sheet metal, however it could be cast if desired. The tray portion of the pan includes a bottom wall 13, side walls 14 and end walls 15, the upper edges of the side and end walls being turned outwardly to form a flange for reinforcement purposes. The flange at the front end of the tray is extended and then turned down to form an angular extension 16. As shown, the central portion 17 of the extension does not extend out or down as far as the side portions, which lends to lightness of the structure without sacrificing rigidity or ruggedness thereof. The forward down turned portions 18 of the extension are provided with an aperture 19 and the walls surrounding such apertures are pressed inwardly forming locating bosses 20, such portions 18 extending substantially parallel with the front tray wall.

A plate 21 for closing the open end of the freezing chamber 11 and for limiting the inward insertion of the pan is detachably secured to the portions 18 of the tray extension. The plate is preferably formed with a handle 22 extending from the outer surface thereof, however the handle need not be an integral part of the plate. The plate is provided with apertures 23 arranged to register with the apertures in the extension portions 18, and the wall surrounding the apertures is bent inwardly to form locating bosses 24 which are adapted to nest in the bosses 20. In this manner the plate can be quickly associated in proper relation with the extension for the reception of the securing means.

Bolts 25 are inserted through the registering apertures in the plate and the extension portions 18, and nuts 26 are screwed on the bolts to clamp the plate to the extension in rigid relation.

It will be seen that the cover plate and handle member described can be quickly applied and removed from the tray extension. It will be further seen that the pan structure is rugged and cheap to manufacture, and that the apertures in the extension will always register with those in the plate, because they are definitely located and can not be varied such as will happen when the extension is separately formed and applied to the tray. The pan structure described will withstand the strain of loosening it from the evaporator wall when frosted therewith.

Various changes can be made in the structure described without departing from the spirit of my invention and the scope of the claims.

What I claim is:

1. A pan for the production of frozen liquids in mechanical refrigerating apparatus comprising a tray, a tray extension having a portion paralleling a wall of the tray, a plate and handle member, said extension and member having locating bosses adapted to register in nested relation, and means for securing said member to the extension.

2. A pan for the production of frozen liquids in mechanical refrigerating apparatus comprising a tray formed with a reinforcing flange around the edge of the walls, the flange being extended from the front wall of the tray and turned down around its edges, a plate and handle member, registering locating means on said plate and said extension, and means securing the plate to the extension when the locating means are associated.

3. A pan for liquids in mechanical refrigerating apparatus comprising a tray, a tray extension projecting outwardly and downwardly from the front wall of the tray, a plurality of bosses formed in the downwardly extending portion of the extension, a plate and handle member, said member being formed with a plurality of complementary bosses adapted to nest with the bosses on the extension, and securing means extending through said nested bosses.

4. A refrigerator tray comprising a body portion formed with a downwardly turned and inwardly indented front wall providing a pair of spaced flange portions, a cover plate positioned against said flange portions in contact therewith and spaced from said indented portion, complementary depressed and projecting portions formed in the spaced flange portions and plate and disposed in nested relationship, securing means extending through the complementary portions for securing the plate to the flange portions, and a handle formed on said cover plate.

In testimony whereof, I have hereunto affixed my signature.

FRANKLIN G. SLAGEL.